United States Patent
Zheng et al.

(10) Patent No.: US 8,705,318 B2
(45) Date of Patent: Apr. 22, 2014

(54) DATA AGGREGATION FOR DRILLING OPERATIONS

(75) Inventors: Shunfeng Zheng, Houston, TX (US); Mbaga Louis Ahorukomeye, Houston, TX (US); James Belaskie, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 1467 days.

(21) Appl. No.: 12/371,734

(22) Filed: Feb. 16, 2009

(65) Prior Publication Data

US 2009/0225630 A1 Sep. 10, 2009

Related U.S. Application Data

(60) Provisional application No. 61/035,310, filed on Mar. 10, 2008.

(51) Int. Cl.

| | |
|---|---|
| *E21B 47/14* | (2006.01) |
| *G01V 1/40* | (2006.01) |
| *G01V 3/00* | (2006.01) |
| *E21B 44/00* | (2006.01) |
| *E21B 47/00* | (2012.01) |

(52) U.S. Cl.
USPC ............ 367/81; 340/853.1; 175/24; 175/40

(58) Field of Classification Search
USPC ........... 175/24–27, 38, 40–50, 57; 340/853.1, 340/853.3; 367/81–85
See application file for complete search history.

(56) References Cited

U.S. PATENT DOCUMENTS

| | | | |
|---|---|---|---|
| 5,519,668 A | 5/1996 | Montaron | |
| 6,799,144 B2 * | 9/2004 | Li et al. | 702/180 |
| 6,868,920 B2 * | 3/2005 | Hoteit et al. | 175/25 |
| 6,968,905 B2 | 11/2005 | Adnan et al. | |
| 6,980,940 B1 | 12/2005 | Gurpinar et al. | |
| 7,096,092 B1 * | 8/2006 | Ramakrishnan et al. | 700/281 |
| 7,142,129 B2 * | 11/2006 | Hall et al. | 340/853.3 |
| 7,705,878 B2 * | 4/2010 | Mandal et al. | 348/85 |
| 2004/0098478 A1 | 5/2004 | Koetke et al. | |
| 2004/0124009 A1 | 7/2004 | Hoteit et al. | |
| 2004/0124012 A1 | 7/2004 | Dunlop et al. | |
| 2004/0220846 A1 | 11/2004 | Cullick et al. | |
| 2005/0149307 A1 | 7/2005 | Gurpinar et al. | |
| 2006/0184488 A1 * | 8/2006 | Wentland | 706/45 |
| 2006/0239118 A1 | 10/2006 | Guidry et al. | |
| 2007/0112547 A1 | 5/2007 | Ghorayeb et al. | |
| 2007/0222588 A1 | 9/2007 | Wolfe | |
| 2008/0137474 A1 * | 6/2008 | Dashevskiy et al. | 367/13 |
| 2008/0208475 A1 * | 8/2008 | Karr et al. | 702/6 |
| 2008/0294606 A1 * | 11/2008 | Moran et al. | 707/3 |
| 2009/0058674 A1 * | 3/2009 | Papouras et al. | 340/853.2 |
| 2010/0147510 A1 * | 6/2010 | Kwok et al. | 166/250.01 |
| 2011/0098931 A1 * | 4/2011 | Kosmala et al. | 702/12 |

FOREIGN PATENT DOCUMENTS

WO   WO 2004007909 A2 *  1/2004  ............ 702/12

* cited by examiner

*Primary Examiner* — Hai Phan
*Assistant Examiner* — Franklin Balseca
(74) *Attorney, Agent, or Firm* — Cuong Lam Nguyen; Rodney Warfford; Dave Hofman

(57) ABSTRACT

A method for aggregating data for a drilling operation. The method includes acquiring the data from a number of data sources associated with the drilling operation, synchronizing a timing of the data for aggregating the data to generate synchronized aggregated data, determining a drilling context based on the synchronized aggregated data, and assigning the determined drilling context to the synchronized aggregated data. The method further includes analyzing the synchronized aggregated data in the drilling context to generate an analysis and presenting the analysis to at least one user.

1 Claim, 14 Drawing Sheets

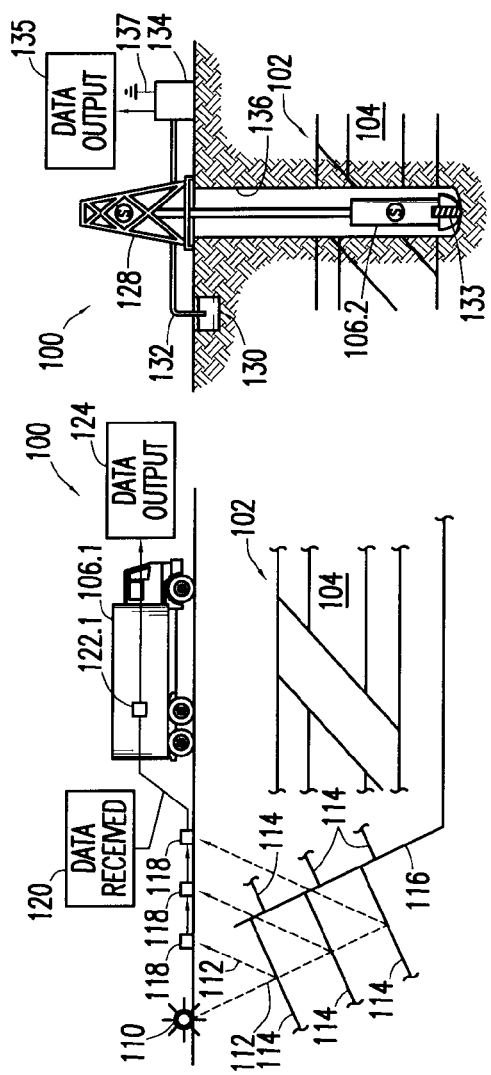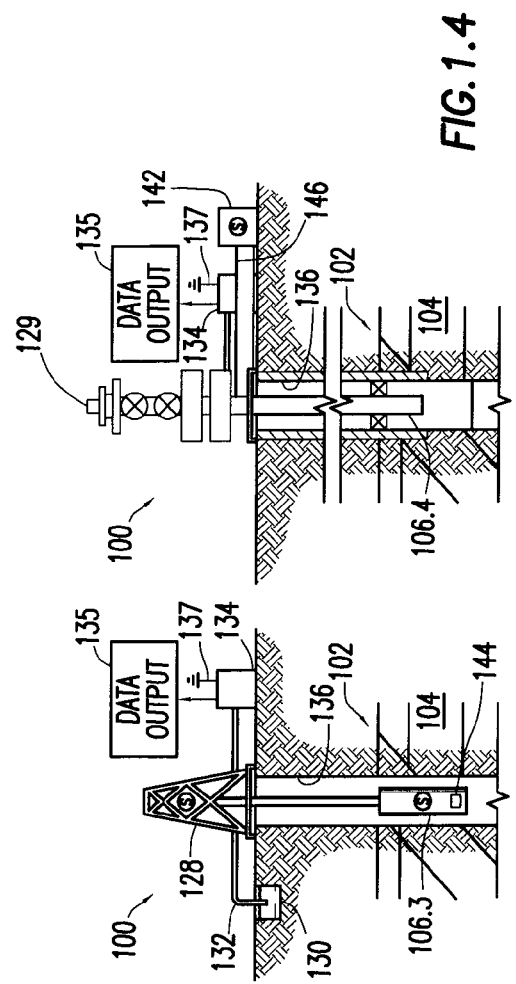

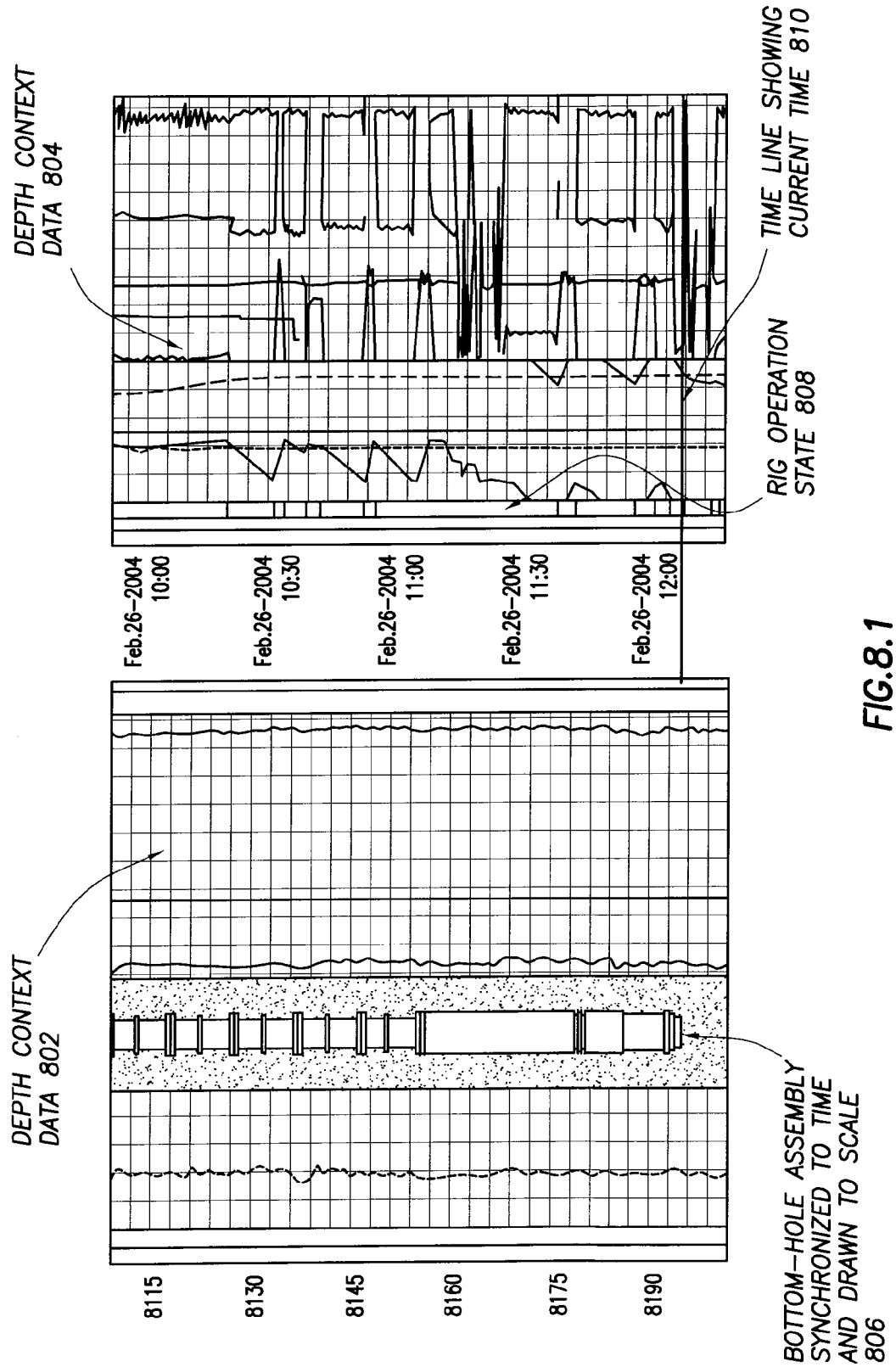
FIG.8.1

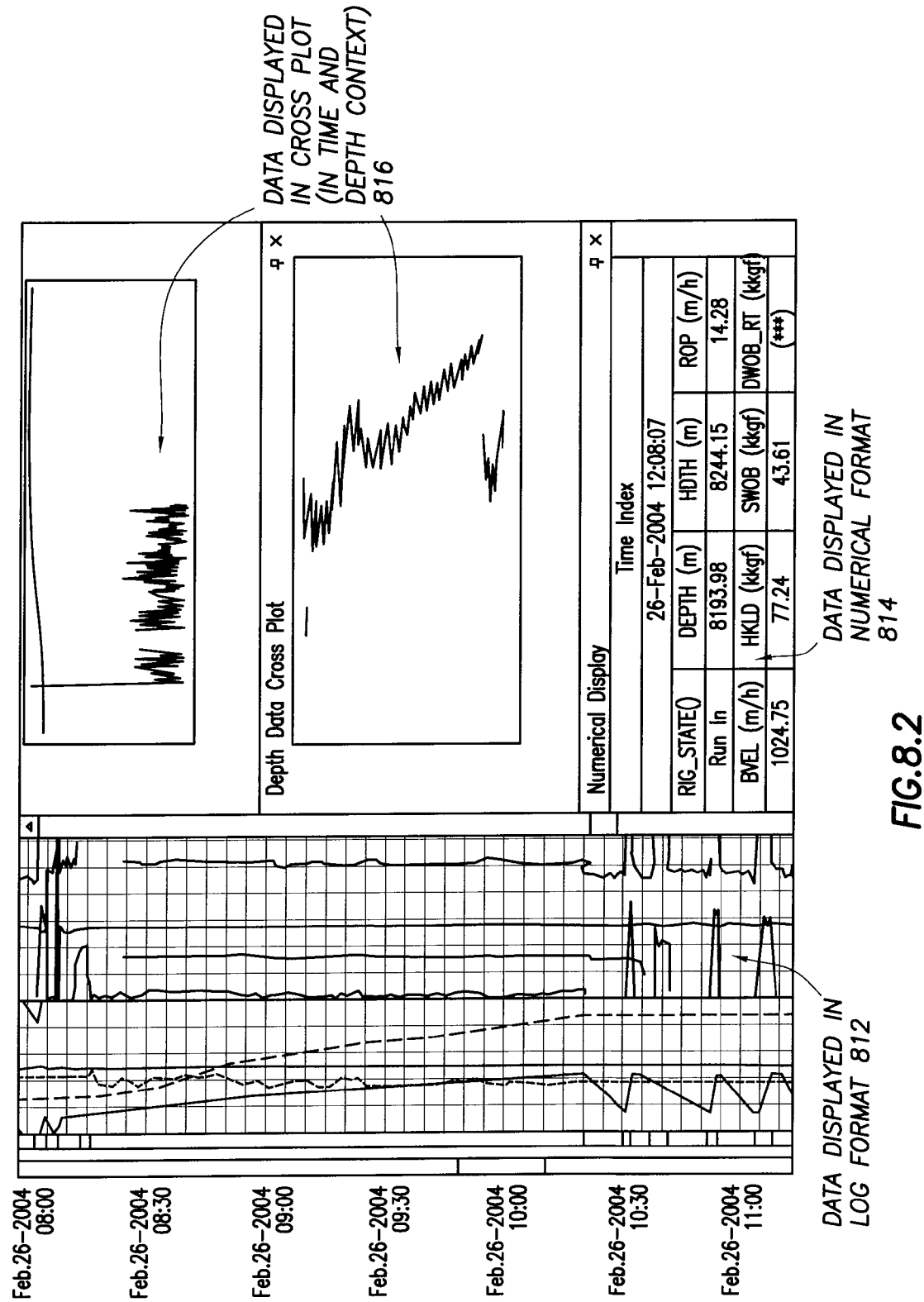
FIG.8.2

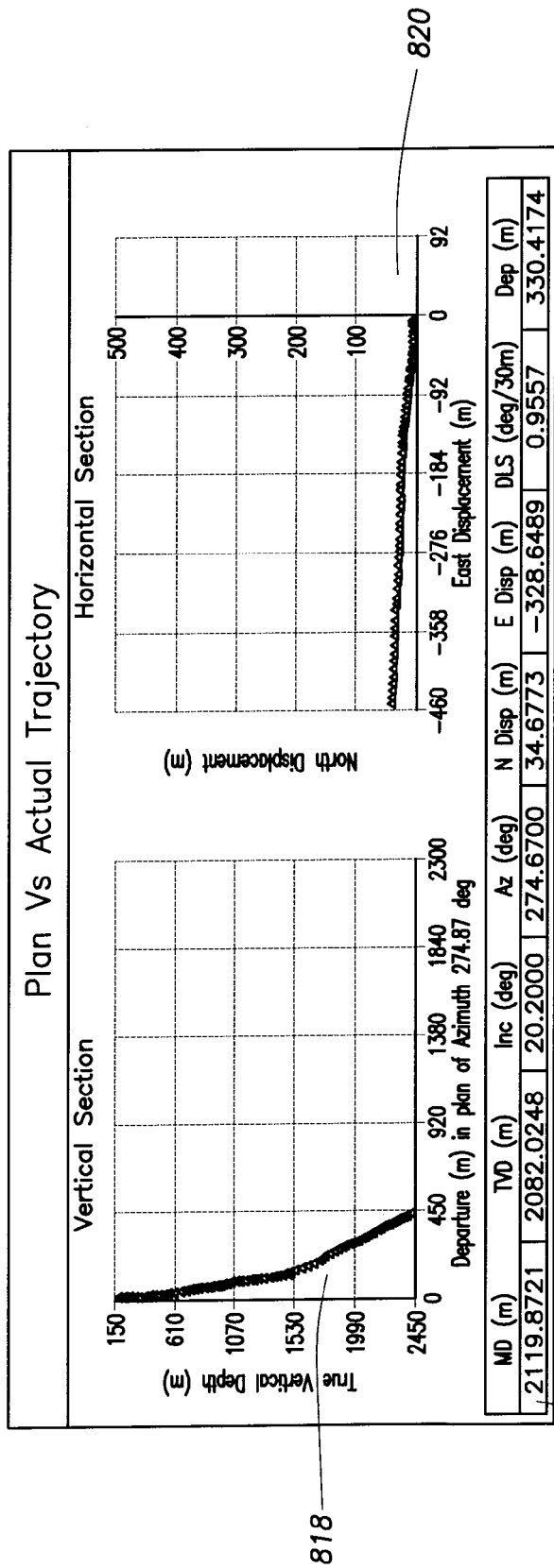
FIG. 8.3

DATA AGGREGATION FOR DRILLING OPERATIONS

CROSS-REFERENCE TO RELATED APPLICATION

This application claims priority, pursuant to 35 U.S.C. §119(e), to the filing date of U.S. patent application Ser. No. 61/035,310, entitled "System and Method for Performing Oilfield Operations," filed on Mar. 10, 2008, which is hereby incorporated by reference in its entirety.

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids.

During drilling and production operations, data is typically collected for analysis and/or monitoring of the operations. Such data may include, for instance, information regarding subterranean formations, equipment, and historical and/or other data.

Data concerning the subterranean formation is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

Various equipment may be positioned about the field to monitor field parameters, to manipulate the operations and/or to separate and direct fluids from the wells. Surface equipment and completion equipment may also be used to inject fluids into reservoirs, either for storage or at strategic points to enhance production of the reservoir.

SUMMARY

A method for aggregating data for a drilling operation. The method includes acquiring the data from a number of data sources associated with the drilling operation, synchronizing a timing of the data for aggregating the data to generate synchronized aggregated data, determining a drilling context based on the synchronized aggregated data, and assigning the determined drilling context to the synchronized aggregated data. The method further includes analyzing the synchronized aggregated data in the drilling context to generate an analysis and presenting the analysis to at least one user.

Other aspects of data aggregation for drilling operations will be apparent from the following description and the appended claims.

BRIEF DESCRIPTION OF THE DRAWINGS

The accompanying drawings, described below, illustrate typical embodiments and are not to be considered limiting of its scope, for data aggregation for drilling operations may admit to other equally effective embodiments. The figures are not necessarily to scale, and certain features and certain views of the figures may be shown exaggerated in scale or in schematic in the interest of clarity and conciseness.

FIGS. 1.1-1.4 depict a schematic view of a field having subterranean structures containing reservoirs therein, various operations being performed on the field.

FIGS. 8.1-8.3 depict examples of data displays in accordance with implementations of various techniques described herein.

DETAILED DESCRIPTION

Figure 2:
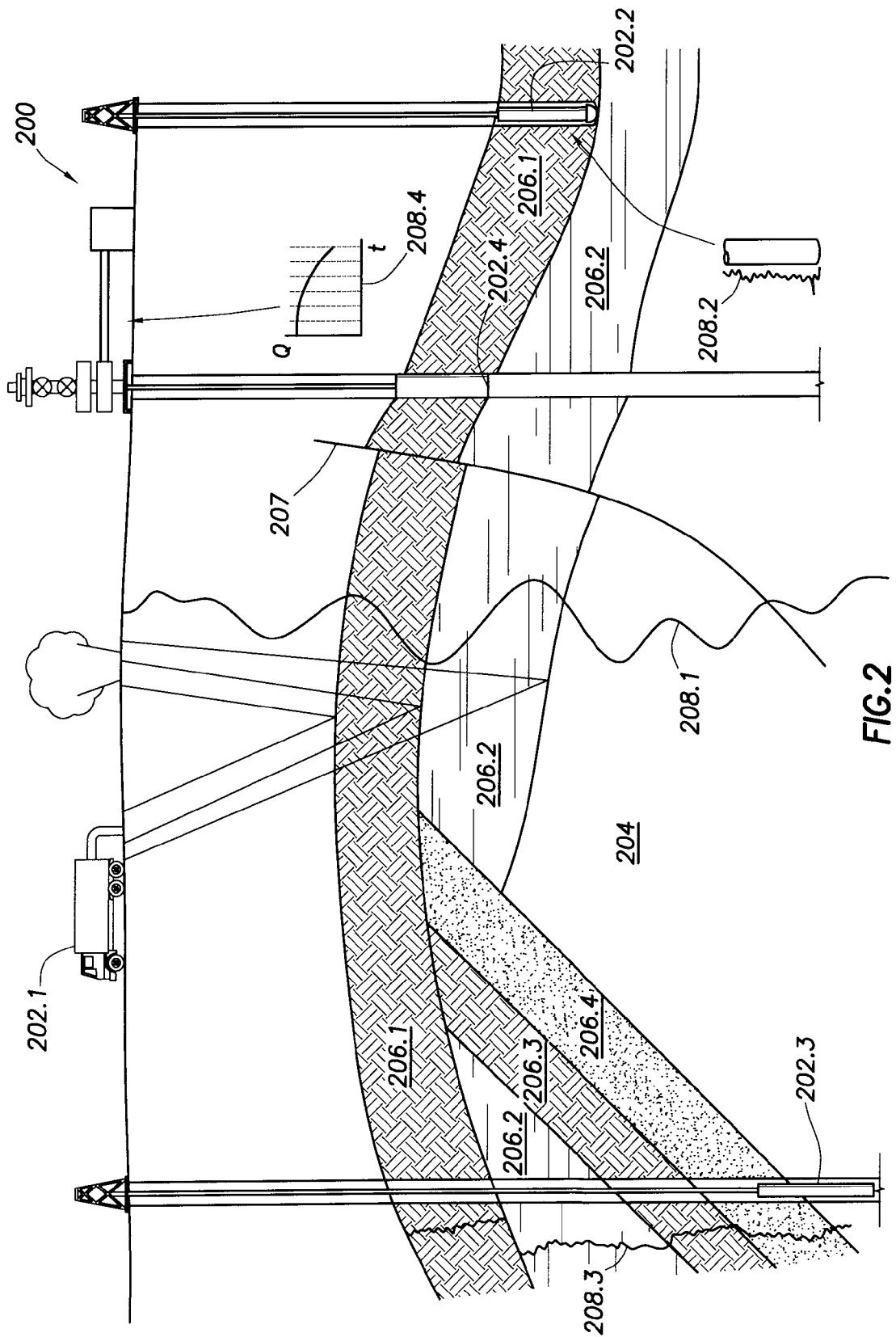
FIG. 2 depicts a schematic view, partially in cross-section of a drilling operation of a wellsite.

Specific embodiments will now be described in detail with reference to the accompanying figures. Like elements in the various figures are denoted by like reference numerals for consistency.

In the following detailed description, numerous specific details are set forth in order to provide a more thorough understanding. In other instances, well-known features have not been described in detail to avoid obscuring embodiments of data aggregation for drilling operations.

FIGS. 1.1-1.4 depict simplified, representative, schematic views of a field 100 having a subterranean formation 102 containing a reservoir 104 therein and depicting various field operations being performed on the field 100. FIG. 1.1 depicts a survey operation being performed by a survey tool, such as seismic truck 106.1, to measure properties of the subterranean formation. The survey operation is a seismic survey operation for producing sound vibrations. In FIG. 1.1, one such sound vibration, a sound vibration 112 generated by a source 110, reflects off horizons 114 in the earth formation 116. A set of sound vibrations, such as the sound vibration 112 is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 depicts a drilling operation being performed by drilling tools 106.2 suspended by a rig 128 and advanced into subterranean formations 102 to form a wellbore 136. Mud pit 130 is used to draw drilling mud into the drilling tools via a flow line 132 for circulating drilling mud down through the drilling tools, then up the wellbore 136 and back to the surface. The drilling mud is usually filtered and returned to the mud pit. A circulating system may be used for storing, controlling, or filtering the flowing drilling muds. The drilling tools are advanced into the subterranean formations 102 to reach the reservoir 104. Each well may target one or more reservoirs. The drilling tools are adapted for measuring downhole properties using logging while drilling tools. The logging while drilling tools may also be adapted for taking core sample 133 as shown, or removed so that a core sample may be taken using another tool.

A surface unit 134 is used to communicate with the drilling tools and/or offsite operations, as well as with other surface or downhole sensors. The surface unit 134 is capable of communicating with the drilling tools to send commands to the drilling tools, and to receive data therefrom. The surface unit 134 collects data generated during the drilling operation and produces data output 135 which may be stored or transmitted. Computer facilities may be positioned at various locations about the field 100 (e.g., the surface unit 134) and/or at remote locations.

Sensors S, such as gauges, may be positioned about the field 100 to collect data relating to various field operations as described previously. As shown, sensor S is positioned in one or more locations in the drilling tools and/or at the rig 128 to measure drilling parameters, such as weight on bit, torque on bit, pressures, temperatures, flow rates, compositions, rotary speed, and/or other parameters of the field operation. Sensors S may also be positioned in one or more locations in the circulating system.

The drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with the surface unit 134. The bottom hole assembly further includes drill collars for performing various other measurement functions.

The bottom hole assembly is provided with a communication subassembly that communicates with the surface unit 134. The communication subassembly is adapted to send signals to and receive signals from the surface using a communications channel such as mud pulse telemetry, electromagnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors S may be collected by the surface unit 134 and/or other data collection sources for analysis or other processing. The data collected by sensors S may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

The surface unit 134 may be provided with a transceiver 137 to allow communications between the surface unit 134 and various portions of the field 100 or other locations. The surface unit 134 may also be provided with or functionally connected to one or more controllers (not shown) for actuating mechanisms at the field 100. The surface unit 134 may then send command signals to the field 100 in response to data received. The surface unit 134 may receive commands via the transceiver 137 or may itself execute commands to the controller. A processor may be provided to analyze the data (locally or remotely), make the decisions and/or actuate the controller. In this manner, the field 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 depicts a wireline operation being performed by a wireline tool 106.3 suspended by a rig 128 and into a wellbore 136 of FIG. 1.2. The wireline tool 106.3 is adapted for deployment into the wellbore 136 for generating well logs, performing downhole tests and/or collecting samples. The wireline tool 106.3 may be used to provide another method and apparatus for performing a seismic survey operation. The wireline tool 106.3 of FIG. 1.3 may, for example, have an explosive, radioactive, electrical, or acoustic energy source 144 that sends and/or receives electrical signals to surrounding subterranean formations 102 and fluids therein.

The wireline tool 106.3 may be operatively connected to, for example, geophones 118 and a computer 122.1 of a seismic truck 106.1 of FIG. 1.1. The wireline tool 106.3 may also provide data to the surface unit 134. The surface unit 134 collects data generated during the wireline operation and produces data output 135 that may be stored or transmitted. The wireline tool 106.3 may be positioned at various depths in the wellbore 136 to provide a survey or other information relating to the subterranean formation 102.

Sensors S, such as gauges, may be positioned about the field 100 to collect data relating to various field operations as described previously. As shown, the sensor S is positioned in wireline tool 106.3 to measure downhole parameters which relate to, for example porosity, permeability, fluid composition and/or other parameters of the field operation.

FIG. 1.4 depicts a production operation being performed by a production tool 106.4 deployed from a production unit or Christmas tree 129 and into a completed wellbore 136 for drawing fluid from the downhole reservoirs into surface facilities 142. The fluid flows from a reservoir 104 through perforations in the casing (not shown) and into the production tool 106.4 in the wellbore 136 and to surface facilities 142 via a gathering network 146.

Sensors S, such as gauges, may be positioned about the field 100 to collect data relating to various field operations as described previously. As shown, the sensor S may be positioned in the production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells (not shown) for added recovery. One or more gathering facilities may be operatively connected to one or more of the wellsites for selectively collecting downhole fluids from the wellsite(s).

While FIGS. 1.2-1.4 depict tools used to measure properties of a field, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors S may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with data aggregation for drilling operations. Part, or all, of the field 100 may be on land, water, and/or sea. Also, while a single field measured at a single location is depicted, data aggregation for drilling operations may be utilized with any combination of one or more fields, one or more processing facilities and one or more wellsites.

FIG. 2 is a schematic view, partially in cross section of field 200 having data acquisition tools 202.1, 202.2, 202.3 and 202.4 positioned at various locations along the field 200 for collecting data of the subterranean formation 204. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along the field 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that the field 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the field 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in the static data plot 208.1 from the data acquisition tool 202.1 is used by a geophysicist to determine characteristics of the subterranean formations and features. The core data shown in the static plot 208.2 and/or log data from the well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3:
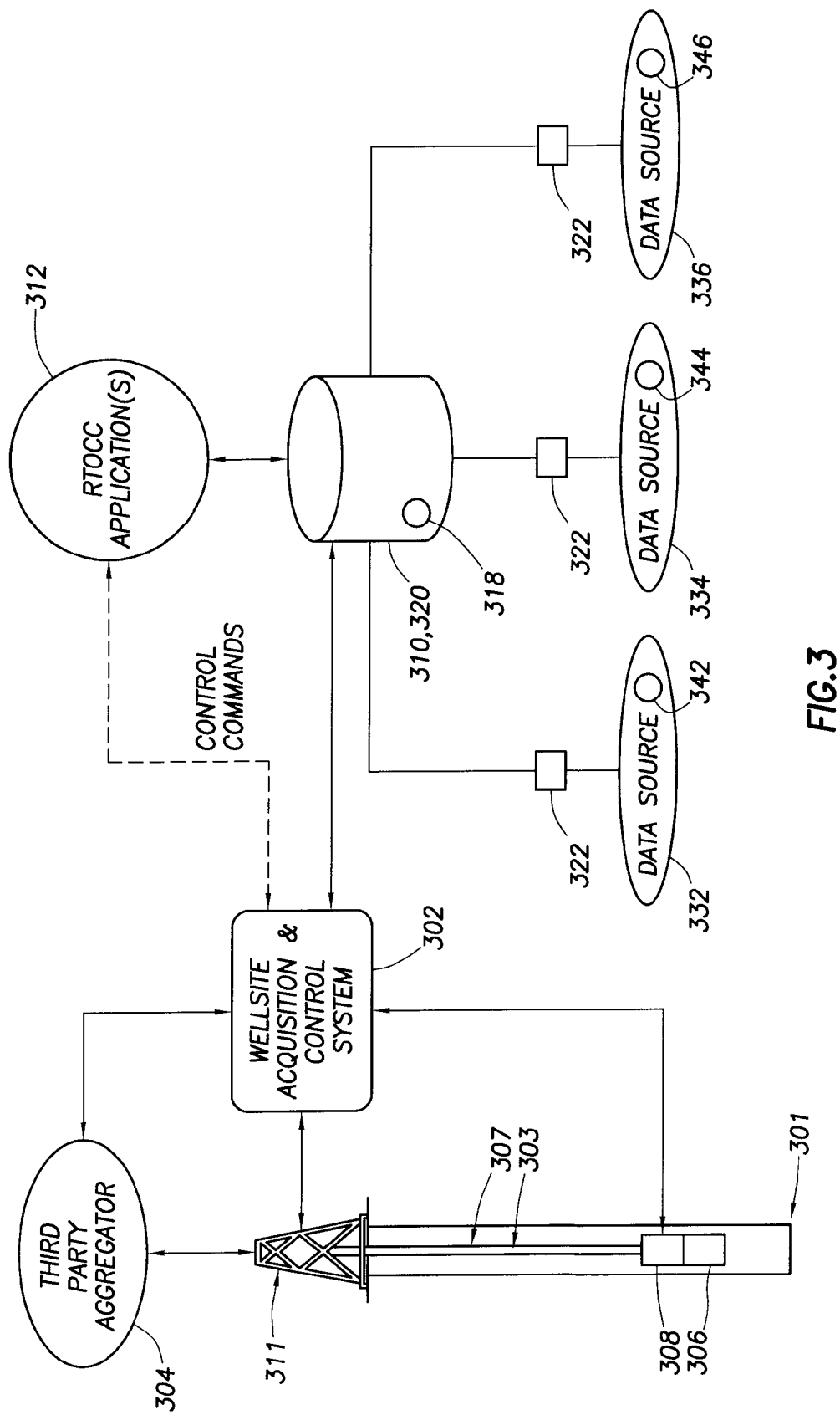
FIG. 3 depicts a schematic diagram of a system for controlling a drilling operation of a field into which implementations of various techniques described herein may be implemented in accordance with one or more embodiments.

FIG. 3 is a schematic diagram depicting a system for data aggregation for a drilling operation of a field. More particularly, FIG. 3 schematically illustrates a system for drilling optimization, collaboration and automated control (DOCC). A wellbore 301 is drilled by a drillstring assembly 303 which includes a bottomhole assembly (BHA) 308 and a drillstring 307. A wellsite acquisition and control system 302 collects surface data from a drilling rig 311 and downhole data from the BHA 308. Other drilling related surface and/or downhole data may be collected through other data aggregators, such as a third party aggregator 304, and passed to the wellsite acquisition and control system 302.

The wellsite acquisition and control system 302 directly interacts with a surface component (not shown) at the drilling rig 311 (e.g, surface unit, the rig, pump, mud system, telemetry system, etc.) to acquire real time data and to control the operation of various drilling system components. The wellsite acquisition and control system 302 may also directly interact with an acquisition, control and telemetry system 306 at the drilling BHA 308. The surface component may provide direct data acquired from surface measurement sensors. Alternatively, it may also include data acquired from other acquisition systems such as the third party aggregator 304.

Real-time data may be acquired by the centralized data and collaboration server 310, 320 from multiple data sources (e.g., 332, 334, 336). Those skilled in the art will appreciate that real-time data may be obtained from any number of data sources. At the beginning of a data aggregation operation, clocks (e.g., 342, 344, 346) at each data source are synchronized with a clock 319 at data server 310/collaboration server 320. All acquired data is time-stamped at the source and transmitted to the data and collaboration server 310, 320. For data sources that cannot provide a timestamp, a token, schematically designated by reference number 322, may be passed between the data source and the data server/collaboration server 310, 320 to determine the round-trip latency. At the data server 310 and collaboration server 320, real-time data coming in from various data sources is properly adjusted to ensure that they refer to the same time clock. Those skilled in the art will appreciate that the drilling system 311, wellsite acquisition and control system 302, the third party aggregator 304, and/or the bottom hole assembly 308 may correspond to data sources as described above.

The wellsite acquisition and control system 302 transmits the data it collects to the centralized data and collaboration server 310, 320 which may be located locally or remotely using wired or wireless technology. One or more real time optimization, control and collaboration application(s) (hereafter RTOCC application(s)) 312 may be used to monitor and analyze the drilling operation. Specifically, the RTOCC application(s) 312 may provide a plurality of users with access to the same drilling data from the wellsite acquisition and control system 302 for participating in job monitoring, optimization, automation and collaboration of the drilling operation as will be described more fully hereinafter.

The RTOCC application(s) 312 may be located in proximity to each other. Alternatively, the RTOCC application(s) 312 may be located remotely from each other. One of a plurality of RTOCC applications(s) 312 may be enabled to send a control command to affect a drilling operation. A satellite (now shown) may be used to enable data/voice/video communication between the wellsite acquisition and control system 302 and remotely located users and among users that may be remotely located with respect to one another.

Figure 4:
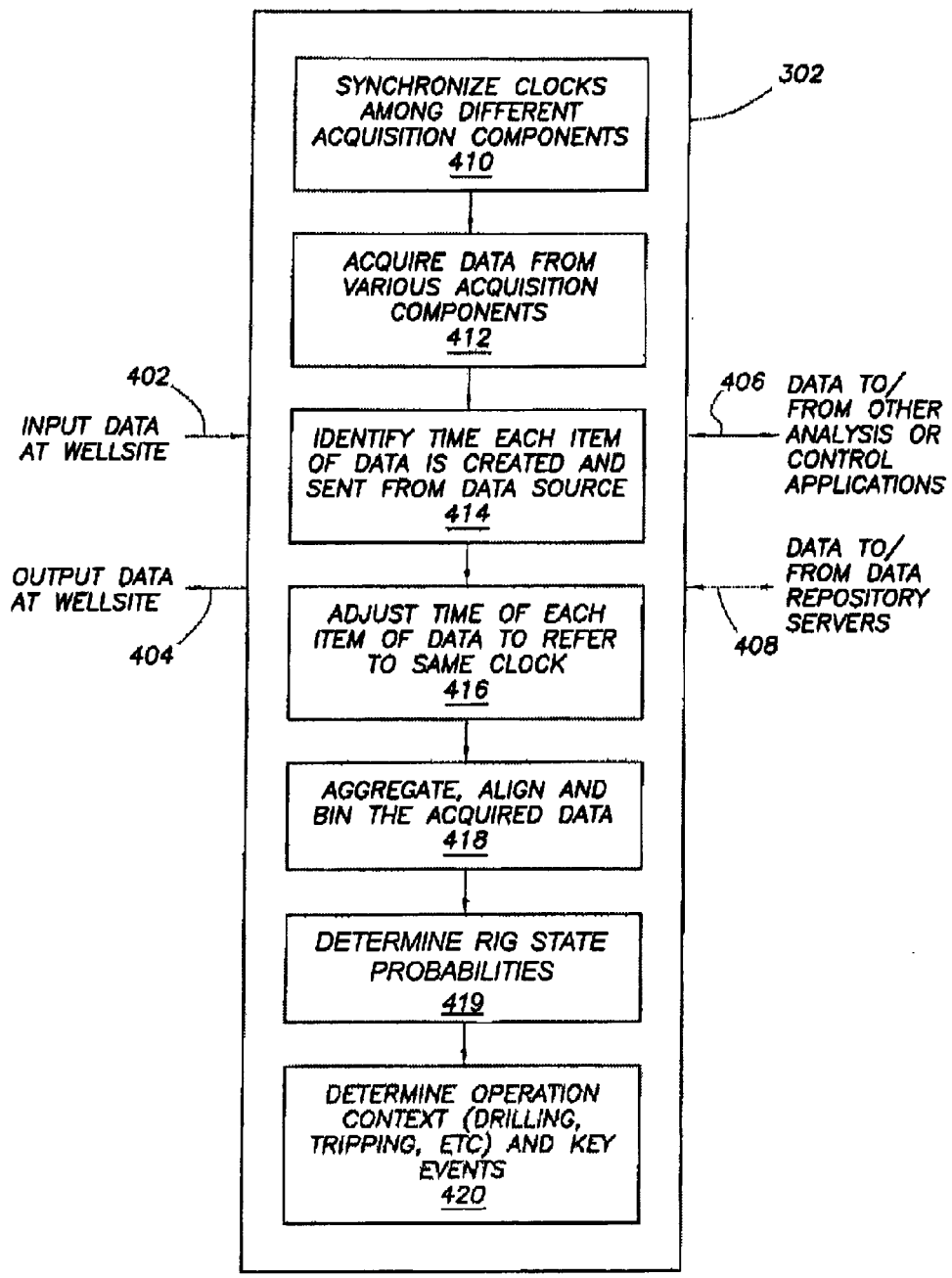
FIG. 4 depicts a schematic diagram of an operation of the wellsite acquisition and control system of the drilling optimization, collaboration and automated control system of FIG. 3.

The wellsite acquisition and control system 302 is illustrated in greater detail in FIG. 4. More particularly, FIG. 4 is a schematic diagram depicting operation of the wellsite acquisition and control system of the drilling optimization, collaboration and automated control system of FIG. 3. The wellsite acquisition and control system 302 generally includes various acquisition and control system hardware and software.

As shown in FIG. 4, the wellsite acquisition and control system 302 receives input data from the wellsite as shown at 402, and outputs data to the wellsite as shown at 404. In addition, the wellsite acquisition and control system 302 transmits/receives data to/from other analysis or control applications as shown at 406, and transmits/receives data to/from data repository/server 310/320 illustrated in FIG. 3 as shown at 408.

The wellsite acquisition and control system 302 is configured to aggregate and synchronize data from various different acquisition components. A description of the process of aggregation and synchronization follows and may be implemented as block 1108 in the flowchart of FIG. 11.

The wellsite acquisition and control system 302 includes a synchronizing mechanism for synchronizing clocks among various different acquisition components 410, for example, sensors S illustrated in FIGS. 1.2-1.4, at the wellsite. At this stage, the wellsite acquisition and control system 302 acquires data from the various acquisition components (i.e., data sources) as shown at 412. Acquired data may include both surface data (e.g., tripping speed, hookload) and downhole data (e.g. survey data, measurements).

The time that each item of data was created and sent from a data source is identified 414. The time may be identified by time-stamping each item of data at the data source and transmitting the time stamp to the server with the item of data. Alternatively, for data sources that cannot provide time stamps, a token is passed between the data source and the server to permit the round-trip latency of the item of data to be determined. In this case, the time the data item was created is identified based on the time of receipt at the server as adjusted by the round-trip latency. Models may also be used, for instance, to estimate the transmission time of a measurement while drilling tool from downhole to surface (based on the sound wave propagation in drilling mud).

At the server, the data acquired from the plurality of sources is time adjusted to refer to the same clock 416. Once the data is placed on the same clock, as will be described more fully hereinafter, the wellsite acquisition and control system 302 then aggregates, aligns and bins the acquired data for efficient analysis as shown at 418. Separate probabilities of the rig being in various states may be determined as shown at 419. At this stage, the wellsite acquisition and control system 302 may also determine a drilling context, such as the drilling, tripping, etc., and key events as shown at 420.

The drilling context is also referred to herein as "Rig State." The Rig State computation may automatically compute the state of the rig based on surface (and/or downhole) sensors based on separate probabilities of the rig being, for example, in slips, on bottom drilling, pumping, rotating the drillstring, and moving the drillstring axially, as shown at 419 in FIG. 4. These probabilities may be combined to determine whether the rig is in one of any number of possible states. For example, the largest probability state of the plurality of probability states may be used to give the drilling context or Rig State, such as to give the drilling context or Rig State to subsequent acquired data. Those skilled in the art will appreciate that the number of states may be determined based on the granularity of information required. The current Rig State may provide a context for other data that is being interpreted or analyzed.

The wellsite acquisition and control system 302 also includes acquisition and control software, including an application that provides a human interface for the wellsite operation to interact with the acquisition and control system. The acquisition and control software may also provide additional intelligence to interpret acquisition data (such as de-modulating mud pulse signal, etc). Furthermore, a basic automated control algorithm can be built into the software to ensure the operation is fail-safe. For example, if a particular parameter is about to exceed a critical value, the automated control feature may notify the control system to either shutdown the operation, or perform certain manipulations (such as to reduce the pump pressure) to maintain the system in safe mode.

Referring back to FIG. 3 and the data flow schematically depicted therein, as indicated above, the wellsite acquisition and control system 302 also interacts with the acquisition, control and telemetry system 306 at the drilling BHA 308. The acquisition, control and telemetry system 306 acquires key downhole data, and uses a telemetry system to transmit the data to the surface. The acquisition, control and telemetry system 306 may also have computing power to process acquired data, and feedback the processed results to the downhole control system. The downhole control system controls the movements of the BHA 308, e.g., orientation, which in turn causes a change to well trajectory.

Communication between the surface wellsite acquisition and control system 302 and the downhole acquisition, control and telemetry system 306 may be one-way only, where the data may flow only from downhole to the surface. In some embodiments, however, the communication between the surface wellsite acquisition and control system 302 and the downhole acquisition, control and telemetry system 306 is two-way, where the data may be sent from surface to downhole, and vice versa. With two-way communication, the operation of the BHA 308 may be controlled either by the wellsite acquisition and control system 302 or by any of real-time monitoring, optimization, collaboration and control applications (RTOCC applications) 312.

FIG. 3 also illustrates a data server 310/collaboration server 320. The data server 310 serves as an acquisition data repository. It interacts with the wellsite acquisition and control system 302 to receive the real-time data, and provides the mechanism for data retrieval by other applications (such as a drilling optimization, collaboration and control application). The data server 310 also interacts with other applications (such as the RTOCC application(s) 312) to receive key optimization data. Any data stored in the data server 310 is available to any applications connected to the server. As a result, wellsite acquisition and control system 302 may receive RTOCC data through an interface at data server 310. An example of data server 310 may be based on the OPC (OLE for Process Control) server concept ("OLE" stands for "Object Linking and Embedding"). The data server 310 may reside at the wellsite, or at a location remote from the wellsite. Alternatively, the data/collaboration server (310, 320) may be implemented as multiple data/collaboration servers, where one of the servers is located at the wellsite and the other server is located at a location remote from the wellsite. In this case, the data/collaboration server (310, 320) may be configured to periodically synchronize data to ensure that users at both locations (i.e., the wellsite and the remote location) are accessing the same information The collaboration server 320 may be provided if real-time collaboration is needed or desired. The collaboration server 320 allows users who use the RTOCC applications 312 to share their analysis information. For example, real-time voice, data, and whiteboard communications may be enabled through the collaboration server 320.

The data server 310 has access to all operation parameters, allowing many features to be integrated into the server. Such features may, for example, include:

Automated control features: the data server 310 may analyze all parameters (both acquisition data and key analysis data) and determine whether certain operation parameters require modification. If modifications are required, the data server 310 may send out a control command to the wellsite acquisition and control system 302 to initiate the modifications.

Alarm callouts: when the data server 310 receives an alarm from the wellsite acquisition and control system 302, or from an RTOCC application 312, the data server 310 can work in conjunction with the collaboration server 320 to notify the appropriate individuals at the appropriate time. Since the collaboration server 320 provides real time voice and data communication, the collaboration server 320 may configure the notification list based on the level of alarms and send out the notification in a manner that is most suitable to the users.

In FIG. 3, the RTOCC applications(s) 312 provide two major functionalities. Initially, by using the real-time data from the data server 310, the RTOCC applications 312 may monitor and analyze drilling performance in real-time. In this case, the drilling context may be determined at the RTOCC application 312, instead of at the wellsite acquisition and control system 302. In addition, by analyzing previous drilling data (historical data) from offset wells (either coming from the data server, or from a separate source), the RTOCC application(s) 312 provide relevant information to anticipate potential drilling problems proactively. With the availability of both real-time and historical data, an optimized drilling program can be developed, which maybe used to initiate control of a drilling operation. The control command can be issued from RTOCC application(s) 312 and transmitted to the data server 310, which, in turn, transmits the command to the wellsite acquisition and control system 302. Alternatively, the control command can be directly issued from an RTOCC application 312 and delivered to the wellsite acquisition and control system 302.

The RTOCC application(s) 312 may also include collaboration features to enable users from different locations (either across a rig floor, or across a wide geographical area) to share information. The system of FIG. 3 may include any number of RTOCC applications 312 being run simultaneously, and which may communicate with each other through the data and/or collaboration servers 310, 320.

The collaboration features may include, for example, voice, data and whiteboard collaboration. Such collaboration features allow users at different locations to monitor the progress of an ongoing job simultaneously and to participate in real-time discussions to diagnose and identify possible solutions to any potential drilling problems.

In a collaboration environment, one RTOCC application 312 may be designated as a master RTOCC application such that control commands for wellsite acquisition and control system 302 may be issued only through this master RTOCC application. Different RTOCC application(s) 312 may serve as the master DOCC at different times, but only one RTOCC application 312 can serve as the master RTOCC application at any given time. Alternatively, there may not be a master RTOCC application designated, in which case, each RTOCC application 312 may issue control commands to the wellsite acquisition and control system 302. In this alternative embodiment, additional control features may be built within the wellsite acquisition and control system 302 to avoid any conflict in executing the control commands from various RTOCC application(s) 312.

Operation data may be acquired in various ways. Downhole data, for example, may be acquired through downhole mechanical and electric sensors on the BHA 308. The downhole data is sent to wellsite acquisition and control system 302 by various telemetry mechanisms, e.g., wired telemetry or wireless telemetry (for example, using pressure pulse technology). Acquired data may be time-stamped at the moment the data is acquired downhole. Alternatively, acquired data may be time-stamped at data server 310/collaboration server 320 taking into account the time lag for the data to arrive from downhole.

Surface data may also be obtained in various ways from one or a plurality of data sources. For example, surface data may include data acquired from a service company that collected the data, or be data collected by a client or by one or more third parties (i.e., third party aggregators 304).

Once operation data is acquired in real-time, the operation data may be combined with planned data and/or relevant data from multiple sources for data analysis, identify potential issues in the operation. The planned data may include, but is not limited to, a planned well trajectory, tubulars, and a drilling program. Alternatively, data from representative offset wells may be used to predict operational parameters for the planned well. An optimized plan may specify tolerances for all operational parameters. If the operation parameters deviate from one or more specified tolerances, an intervention or a replan may be triggered. Hazards, constraints, limits and tolerances are defined during planning phases to be used for data analysis. Such data analysis is typically done at an RTOCC application 312.

In some embodiments, acquired data may be properly time-stamped at its source at the moment it is acquired. In the event that the data is not time-stamped at its source, the data may be time-stamped along the data transmission path, for example, at the moment the data reaches the wellsite acquisition and control system 302 or at the moment it arrives at the data server 310/collaboration server 320. With each data point properly time-stamped at the data server 310/collaboration server 320, the acquired data may be synchronized for monitoring and analysis. Note that data collection and synchronization may be done at the wellsite acquisition and control system 302, the data server 310, and/or the collaboration server 320.

Those skilled in the art will appreciate that data channels may also synchronized relatively based on a correlated signature of data.

Synchronization based on a correlated signature of data is discussed below in more detail with respect to FIG. 5.

While specific components are depicted and/or described for use in the units and/or modules of the drilling optimization, collaboration and automated control, it will be appreciated that a variety of components with various functions may be used to provide the formatting, processing, utility and coordination functions necessary to provide data aggregation for drilling operations in the drilling optimization, collaboration and automated control. The components may have combined functionalities and may be implemented as software, hardware, firmware, or combinations thereof.

Figure 5:
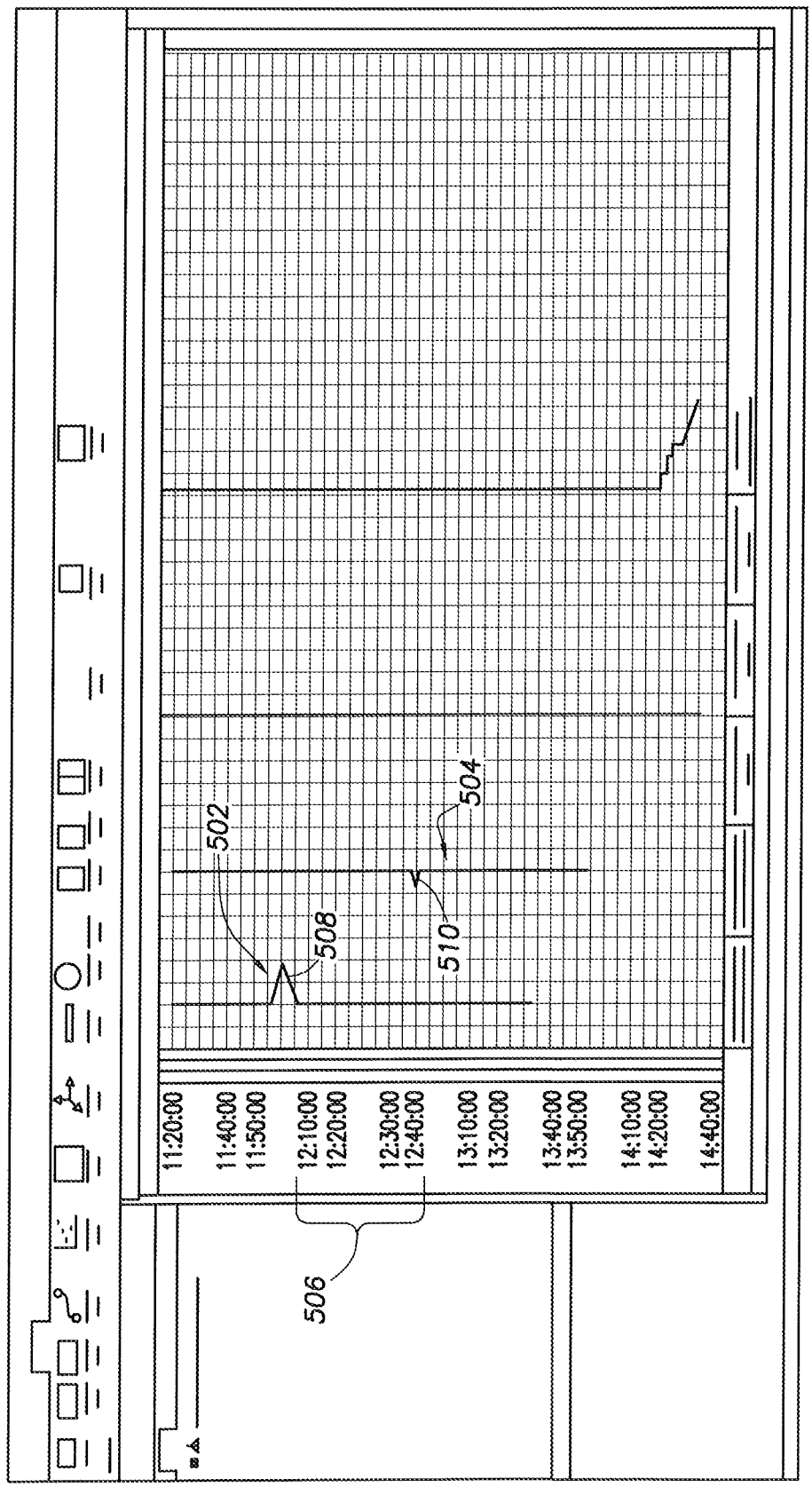
FIG. 5 depicts a graph of data synchronization based on signal signature in accordance with implementations of various techniques described herein.

FIG. 5 illustrates a graph of data synchronization based on a signal signature. Suppose a first data channel 502 has a signature 508, which is correlated to the signature 510 of a second data channel 504 (i.e., the signatures occur simultaneously). By plotting the data channels together on the same time-based log, as shown in FIG. 5, it can be seen that the clock on channel 502 and the clock on channel 504 are off by 40 minutes as shown at 506. By adjusting the time index of these two channels accordingly, the data channels can be synchronized on the same clock.

Once all acquired data is properly placed on the same clock using the synchronization methods discussed with respect to FIGS. 4 and 5, the data may be further processed to properly align the data for efficient data analysis. This alignment processing is called data "binning", or data re-sampling. The binning size may be fixed, i.e., the interval between any two adjacent data points is constant for all data points. Alternatively, the binning size may be variable, i.e., the interval between any two adjacent data points is not a constant. For greater efficiency, the data bin size, or the re-sampling frequency, is determined by the application that consumes that data. A number of schemes are available to perform data binning, including, but not limited to, the following schemes:

Scheme 1: Binning Based on the Highest Frequency Data

A minimal data bin size is determined based on the highest frequency of the data channel that is received (i.e., highest data rate). Any data channel that has lower frequency is processed into this highest frequency. Certain binning rules should be applied consistently on all data channels to maintain consistency. A diagram that illustrates a process of binning data channels based on highest frequency is shown in TABLE 1.

TABLE 1

| Channel A | | | | | | | |
|---|---|---|---|---|---|---|---|
| Time | | | | | | | |
| | 0 | 2 | 4 | 6 | 8 | 10 | 12 |
| Value | A1 | A2 | A3 | A4 | A5 | A6 | A7 |
| Channel B | | | | | | | |
| Time | | | | | | | |
| | 0 | 5 | 10 | 15 | 20 | 25 | 30 |
| Value | B1 | B2 | B3 | B4 | B5 | B6 | B7 |
| Channel B (after processed, based on the frequency of channel A) | | | | | | | |
| Time | | | | | | | |
| | 0 | 2 | 4 | 6 | 8 | 10 | 12 |
| Value | B1 | B1 | B1 | B2 | B2 | B2 | B3 |

Scheme 2: Binning Based on the Optimized Binning Size Determined by the Application that Consumes the Data The application that consumes the data determines a fixed binning size. All channel data is processed to fit this determined binning size. Again, certain binning rules may be applied to achieve consistency. A diagram that illustrates a process of binning based on a bin size of 3 is shown in TABLE 2.

TABLE 2

| Channel A | | | | | | | |
|---|---|---|---|---|---|---|---|
| Time | | | | | | | |
| | 0 | 2 | 4 | 6 | 8 | 10 | 12 |
| Value | A1 | A2 | A3 | A4 | A5 | A6 | A7 |
| Channel B | | | | | | | |
| Time | | | | | | | |
| | 0 | 5 | 10 | 15 | 20 | 25 | 30 |
| Value | B1 | B2 | B3 | B4 | B5 | B6 | B7 |
| Time | | | | | | | |
| | 0 | 3 | 6 | 9 | 12 | 15 | 18 |
| Channel A (after processed) | | | | | | | |
| Value | A1 | 0.5 (A2 + A3) | A4 | 0.5 (A5 + A6) | A7 | 0.5 * (A8 + A9) | A10 |
| Channel B (after processed) | | | | | | | |
| Value | B1 | B1 | B2 | B2 | B3 | B4 | B5 |

Scheme 3: Variable Binning Size

In this scheme, the time index for processed data channels is simply a combination of all available data channels. A diagram that illustrates a process of binning based on a variable binning size determined by the time interval between any two acquired data points is shown in TABLE 3.

TABLE 3

| Channel A | | | | | | | |
|---|---|---|---|---|---|---|---|
| Time | | | | | | | |
| | 0 | 2 | 4 | 6 | 8 | 10 | 12 |
| Value | A1 | A2 | A3 | A4 | A5 | A6 | A7 |
| Channel B | | | | | | | |
| Time | | | | | | | |
| | 0 | 5 | 10 | 15 | 20 | 25 | 30 |
| Value | B1 | B2 | B3 | B4 | B5 | B6 | B7 |
| Time | | | | | | | |
| | 0 | 2 | 4 | 5 | 6 | 8 | 10 |
| Channel A (after processed) | | | | | | | |
| Value | A1 | A2 | A3 | 0.5 (A3 + A4) | A4 | A5 | A6 |
| Channel B (after processed) | | | | | | | |
| Value | B1 | B1 | B1 | B2 | B2 | B2 | B3 |

Figure 6:
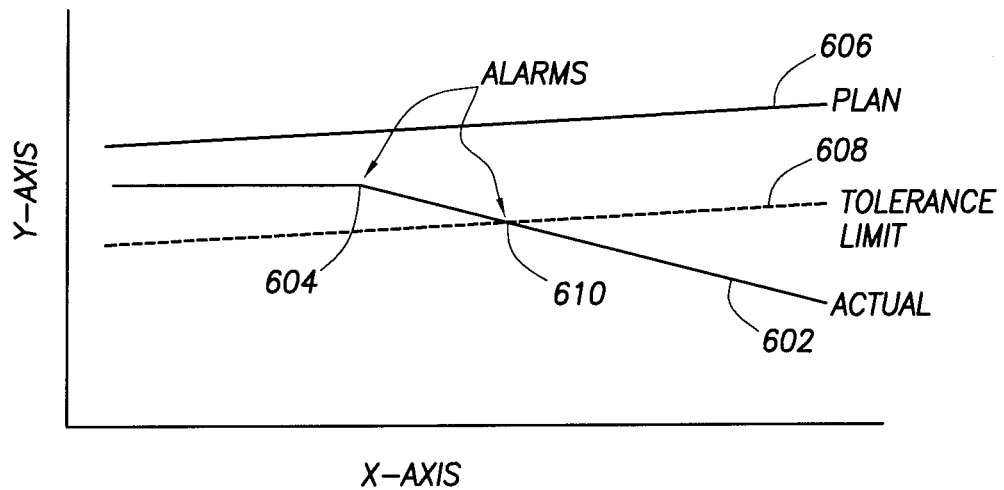
FIG. 6 depicts a graph of an example of alarms being triggered by deviation from a planned profile in accordance with implementations of various techniques described herein.

The results of data analysis may be used in the many ways to aid in drilling operations. Examples of different ways analysis results may be used include, but is not limited to:

For monitoring and display
To identify drilling problems, and/or to trigger alarms
For drilling optimization
For automation and control
For economic analysis of the drilling operation FIG. 6 is a graph that schematically illustrates an example of alarms being triggered by deviation from a planned profile. In the example illustrated in FIG. 6, alarms are triggered by an abrupt change in an actual parameter 602 at point 604, and by the deviation of a planned profile 606 exceeding a prescribed tolerance 608 at point 610. Various kinds of alarms can be raised in this manner. For example, alarms can be triggered when operation conditions exceed safe operation limits of the drilling equipment. Alternatively, alarms can also be raised when operation procedures deviate from a prescribed procedure. Yet further, alarms can be raised when a well trajectory deviates from a planned well trajectory by more than an allowed tolerance. Alarms can be in the form of visual alarms, audio alarms or both visual and audio alarms.

Figure 7:
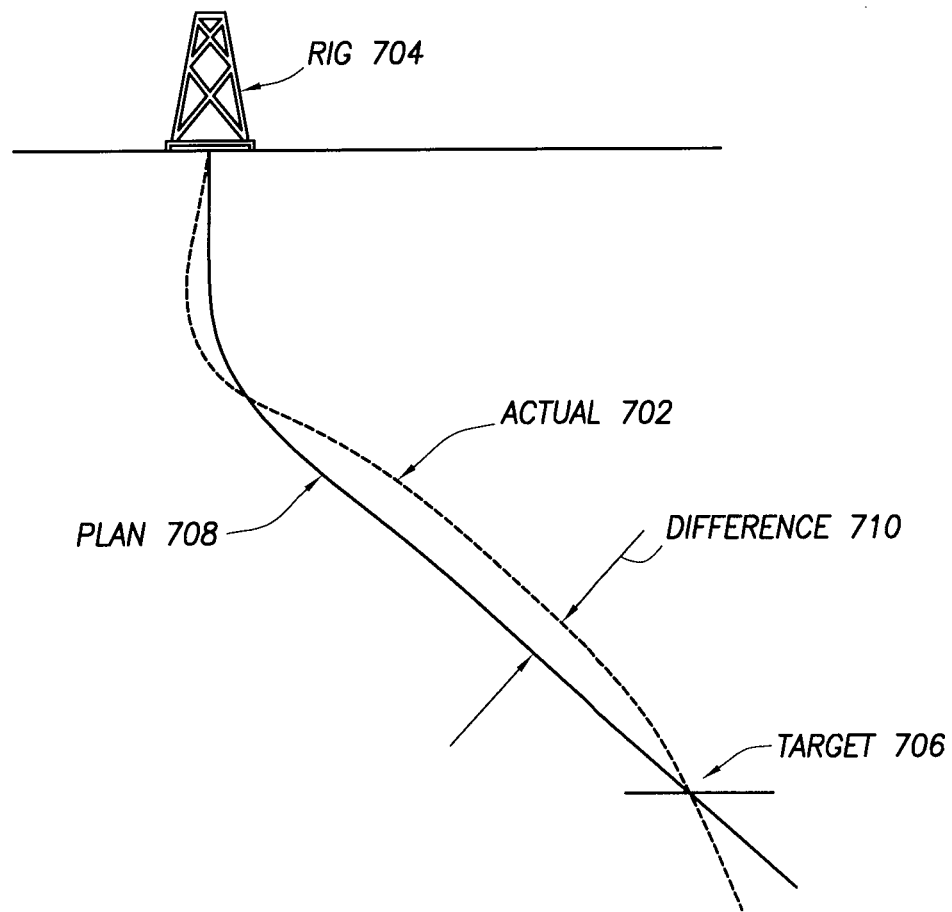
FIG. 7 depicts a diagram of an actual well trajectory deviating from a planned well trajectory in accordance with implementations of various techniques described herein.

FIG. 7 depicts a diagram of an actual well trajectory 702 deviating from a planned well trajectory 708. In FIG. 7, the actual well trajectory 702 from a rig 704 to a target location 706 deviates from planned well trajectory 708 as shown at 710. By using a feedback control loop, for example, the actual well trajectory 702 can be corrected in real-time to reach the target 706 location.

Many simple alarms can be directly built on the data channels discussed with respect to FIGS. 4 and 6. These simple alarms evaluate the acquired data against a simple threshold, such as If a value of channel A>threshold 1
If values of channel A>threshold 1 AND a value of channel B<threshold 2

Using data analysis, more advanced alarms ("smart alarms") may be built into the RTOCC application to improve operation safety and efficiency. These "smart alarms" require advanced data analysis (e.g., to determine a signal pattern) before a logic condition is applied. For example, smart alarms may be used in, but not limited to, the following scenarios:

To detect a signature in data
To compare data to reference data
To eliminate exceptions/false alarms
Simple alarm states combined to yield higher level alarm
Used in combination with action/intervention
Results fed into a control loop Smart alarms may be designed based on a deterministic model. However, a probabilistic approach for designing the smart alarms may be used, for example:

Compatibility with safety, efficiency and financial decisions
  Risks—probability of an event
  Finance—probability of exceeding budget
Utilization of all available/pertinent information
  Low accuracy measurements
  Multiple sources for same measurement
Probabilistic outputs may be combined to yield a higher level alarm Data analysis allows users to have a quantitative view of an entire drilling operation with regard to service quality, safety and drilling efficiency, which, in turn, can be used to obtain an economic benefit. For example, if one service company is able to demonstrate through effective data analysis that it has less service quality issues and/or better drilling efficiency, it is likely that a client may share the benefit of increased efficiency or safety with the service company. Or simply, the service company may have an edge in obtaining the next service contract from the client.

With the availability of modern data acquisition systems, current drilling operations generate an enormous quantity of data over a time span from weeks to months. An RTOCC application may be configured to present this data to drilling engineers in the most effective manner to allow quick identification of drilling problems and/or of the situation downhole. For example, displaying complicated data in different time-related synchronized views such as the following facilitates human understanding of the data:

Display historical, real-time and modeled data in correlation with time.
Display data in an unlimited numbers of different views and formats.
Focus all displays and views on a specific time point or period without requiring manual reconfiguration of the displays.
Display data filtered by a time breakdown of rig operations (i.e., data displayed within the context of rig operations).

Data display and monitoring is typically done at an RTOCC application. FIGS. 8.1-8.3 illustrate examples of data displays. In particular, FIG. 8.1 illustrates a display of 2-dimensional graphics applied to real-time and/or historical time and depth data. In this example, multiple contexts for depth context data 802, 804 are provided. The first depth context data 802 is shown in terms of the drill string, where the bottom-hole assembly is synchronized to time and drawn to scale 806. The second depth context data 804 is shown in terms of the rig operation state 808 along with a time line showing the current time 810.

FIG. 8.2 illustrates displays of data presented in different formats, where all displays are synchronized to a time line and controlled by a time line synchronization control (not shown). In this example, the time-synchronized data is simultaneously displayed in a log format 812, a numerical format 814, and in a cross plot (i.e., in a time and depth context) 816. In some embodiments, each of the different formats may be updated appropriately as the data is received in real-time.

FIG. 8.3 illustrates a display showing trajectory data in a controlled range associated by a time. In this example, the trajectory data is displayed in terms of both a vertical section (i.e., depth versus azimuth) 818 and a horizontal section 820 (i.e., north versus east). The display also includes trajectory parameters 822 for the current position of a drilling operation.

In some embodiments, the data analysis, data display and monitoring described above is for achieving optimization of a drilling operation in order to make the drilling process more efficient and effective. Optimizations may involve completing a drilling operation with minimal cost or risk, or maximizing the drilling rate within a particular stage of a drilling operation. Although the output of an optimization is often relatively easy to measure, most drilling optimizations require understanding many measurements in the proper context and controlling multiple driving parameters. It is also the nature of drilling that optimizations are localized as such optimizations are a continuous process.

The DOCC system enables optimization to be achieved in various manners, including, but not limited to, the following:
- Providing a method to view planned and actual data by displaying the difference between the data in correlation to a time period
- Providing a mechanism allowing users to easily setup or modify conditional alarms, or configure the synchronized display
- Displaying all operation parameters within the context of rig operations
- Obtaining and synchronizing high resolution real-time data
- Automatically determining the context of current rig operations
- Real-time computation of drilling models
- Graphical analyses measurement tools in the context of a drilling operation
- Collaboration of tools to enable expertise from different engineering disciplines
- Computation of new settings of drilling driving parameters.

In some embodiments, the data analysis, data display and monitoring, and optimization provides feedback for a drilling engineer to modify operation parameters in order to achieve operation objectives (e.g., following a planned trajectory, avoiding/reducing operation failures, and/or increasing operation efficiency). The drilling engineer may use feedback information to manually alter operation parameters (e.g., increasing of decreasing the drilling speed, increasing or decreasing pump pressure (pump flow rate), changing the toolface, etc). Alternatively, the feedback information may be used to automatically alter the operation parameters without requiring user intervention.

Figure 9:
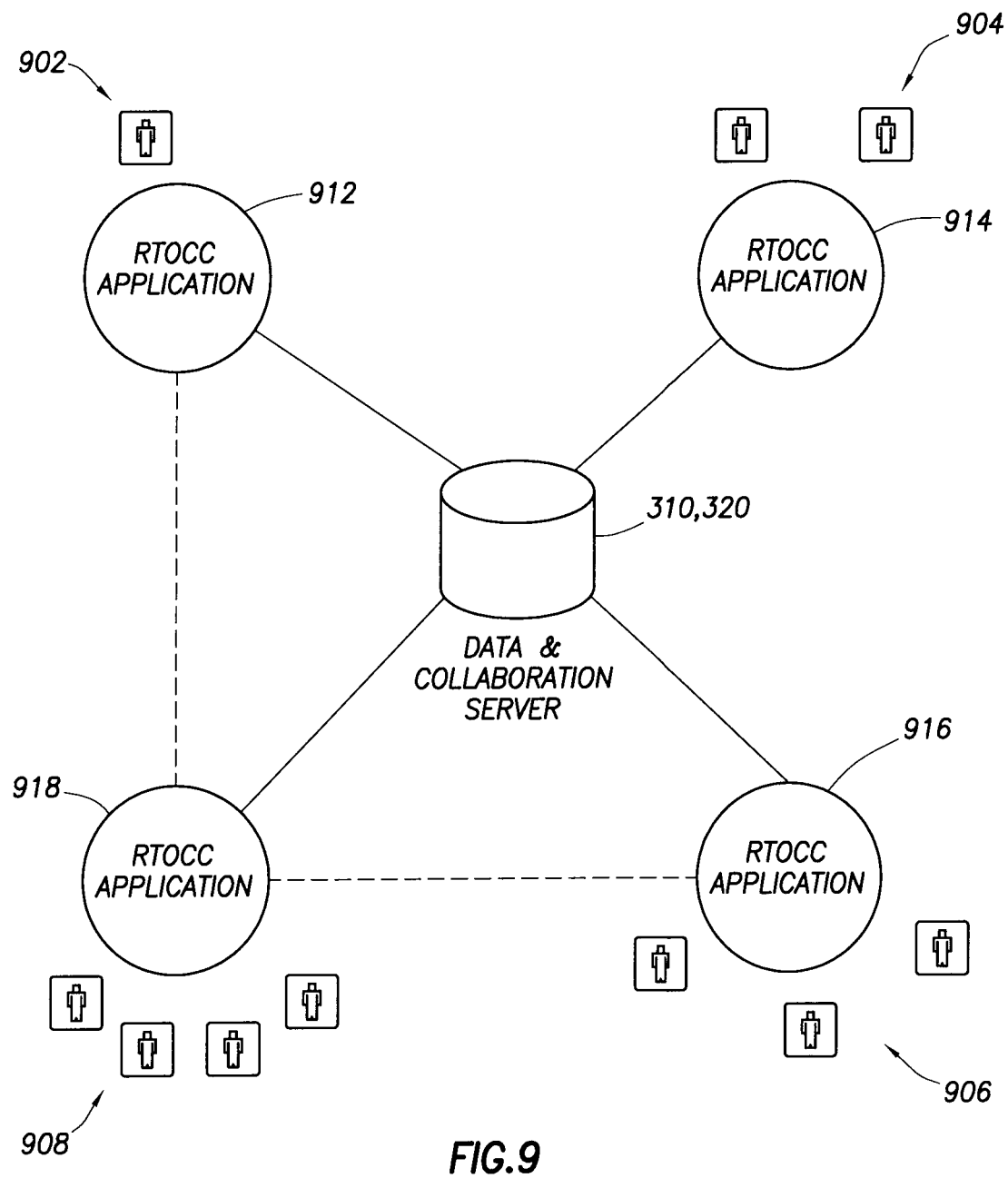
FIG. 9 depicts a schematic diagram depicting a collaboration platform into which implementations of various techniques described herein may be implemented in accordance with one or more embodiments.

Automation is an important mechanism for improving drilling operations. Automation allows for finer control over a drilling process and may deliver a consistency that users are not typically capable of providing. Automation may enable remote drilling by taking less frequent and lagged commands/set points and executing them at the wellsite. In the DOCC system of FIG. 3, automation makes use of the drilling context, alarms and operating status made available by data analysis, data display and monitoring, and optimization to better control the drilling operations. Examples of automation processes may include, but is not limited to:

- A modelling of the system being automated
- Measurement of variables required for automation at the appropriate frequency to accomplish the automation
- Monitoring context information and alarm conditions to enable, adjust or suspend automation
- Measuring and controlling driving parameters for the process being automated
- Measuring an output condition and utilizing the model to determine adjustments needed FIG. 9 is a schematic diagram depicting a collaboration platform. One or a number of users 902, 904, 906, 908 may be using RTOCC applications 912, 914, 916, 918, respectively, at geographically disparate locations and collaborate with one another via a data server 310/collaboration server 320. An RTOCC application may provide one or more of the following functions for collaboration:
- Drilling data visualization and analysis
- Data communication with another instance of the RTOCC application
- Voice communication with another instance of the RTOCC application
- Video communication with another instance of the RTOCC application
- Image, file and annotation sharing with another instance of the RTOCC application One instance of an RTOCC application may communicate with another instance of an RTOCC application. Alternatively, all the instances of the RTOCC applications may communicate with each other in a "conference" type mode.

The data server 310/collaboration server 320 system also enables multiple users of the RTOCC applications to collaborate with respect to a drilling operation. The users may be physically located in the same office, or the users may be physically separated from one another by hundreds or even thousands of miles. The collaboration allows multiple users to:
- View the same drilling operation data, in the same manner (if using the same configuration) or in the manner each user prefers
- Share discussions of the drilling operation through instant messaging, voice communication, video communication, and real time chat
- Share a drawing whiteboard
- Share any annotations or events for the drilling operation generated by a RTOCC application or by any users
- Receive notifications of alarms or events related to the drilling operation by subscription. Notifications may be in the form of an electronic message, a pager, a text message, a mobile phone call, etc.

Alarm subscriptions are a powerful tool for drilling collaboration. Since a drilling operation involves many different services and technologies, collaborating users may be interested in only one or a few services or technologies. By using an alarm or event subscription service, a collaborating user may choose to receive notifications of only the events that the user is most interested in.

Figure 10:
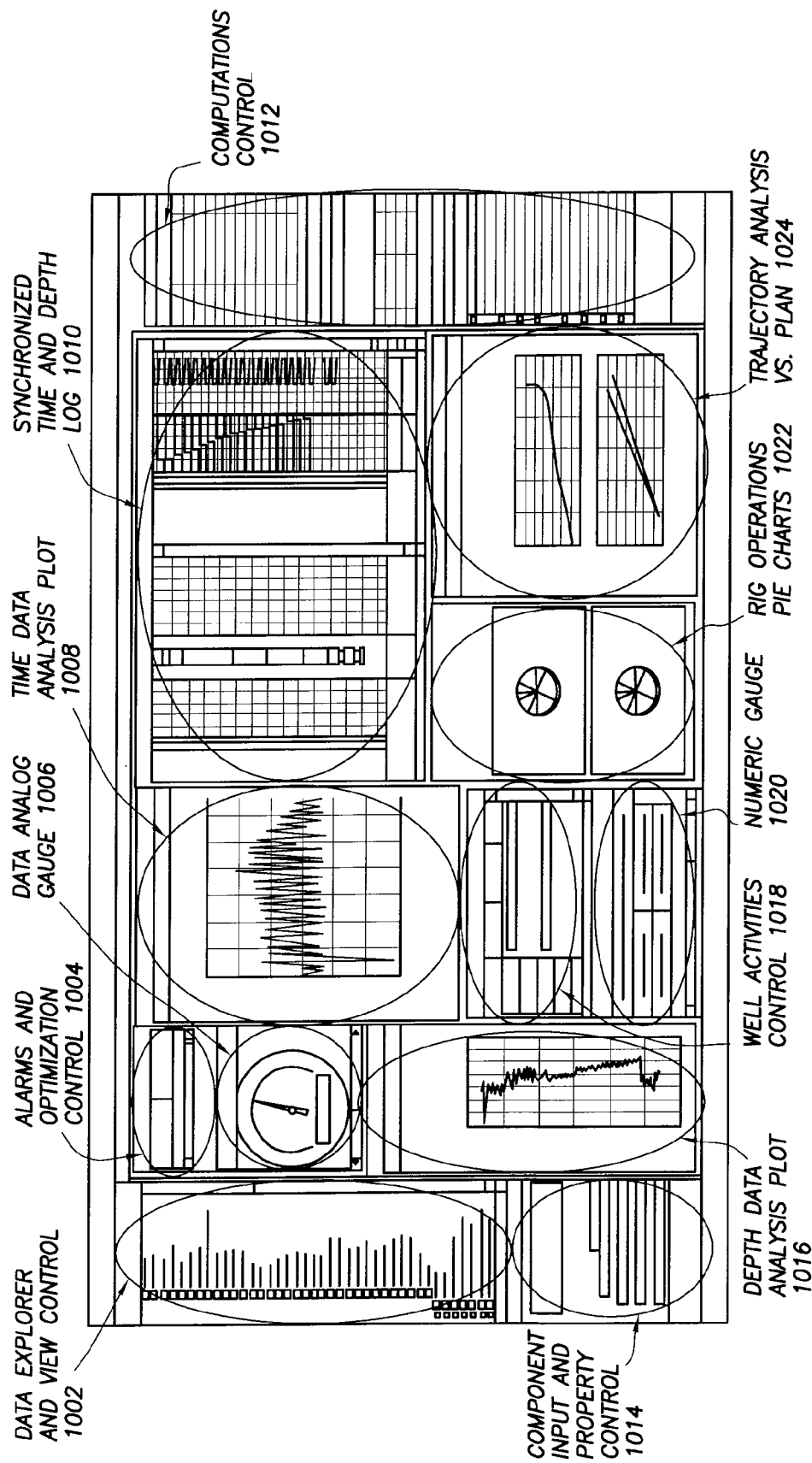
FIG. 10 depicts an example of an application platform that allows visualization, optimization, automation, control and collaboration in accordance with implementations of various techniques described herein.

FIG. 10 illustrates an example of an application platform that allows visualization, optimization, automation, control and collaboration. The application platform allows creation of multiple canvases ("views") based on the needs of a particular job. In this example, the display shows an overview of all necessary drilling data (e.g., data explorer and view controller 1002, alarms and optimization control 1004, data analog gauge 1006, time data analysis plot 1008, synchronized time and depth log 1010, computations control 1012, component input and property control 1014, depth data analysis plot 1016, well activities control 1018, numeric gauge 1020, rig operations and pie charts 1022, trajectory analysis vs. plan 1024, etc.).

In other embodiments, a number of views (e.g., "washout monitoring", "backoff/twistoff monitoring", "stuck pipe detection") may be configured by users based on their specific activity requirements. In this case, the views may be displayed simultaneously on one or a number of screens for a situational display of a drilling operation. Each view may include any number of components including but not limited to the components shown in FIG. 10.

Figure 11:
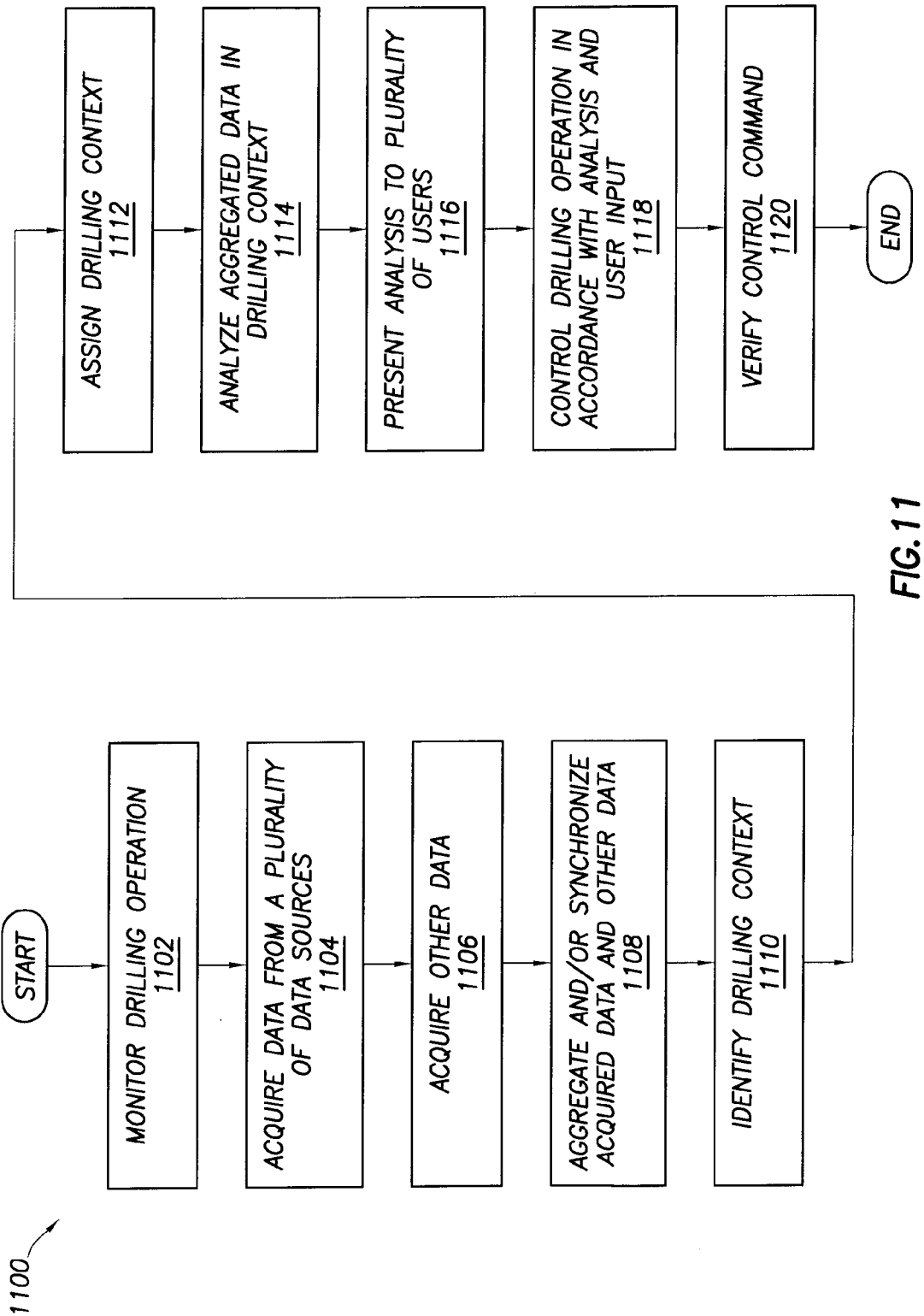
FIG. 11 depicts a flowchart of a process for controlling a drilling operation for a field in accordance with implementations of various techniques described herein.

FIG. 11 is a flowchart of a process for controlling a drilling operation for a field. It should be understood that the operations illustrated in the flow diagram are not limited to being performed by the process. Additionally, it should be understood that while the operational flow diagram indicates a particular order of execution of the process, in some implementations, certain portions of the process might be executed in a different order.

The process is generally designated by reference number 1100, and begins by monitoring a drilling operation (block 1102). Data is acquired from a plurality of data sources with respect to the drilling operation (block 1104). The data may be real-time data. Other data, including historical data and planning data may also be acquired from one or more data sources (block 1106). The acquired data from the data sources and any other acquired data is aggregated to generate aggregated data (block 1108). The aggregating may include synchronizing a timing of the acquired data to form synchronized aggregated data as discussed above with respect to FIG. 4. A drilling context is then determined from the aggregated data (block 1110), and the aggregated data is assigned the drilling context (block 1112). The drilling context may be assigned as discussed above with respect to FIG. 4. The aggregated data is analyzed in the assigned drilling context to form an analysis (block 1114). The analysis is presented to a plurality of users (block 1116), and the drilling operation is adjusted in accordance with the analysis and input of each of the plurality of users (block 1118). After a control command is issued, the response to the control command may be verified (block 1120). This may be done by acquiring and analyzing real-time data. For example, if a command is issued to increase the weight on the drill bit to 10 kilo pounds, real-time data is used to confirm that the weight is, in fact, increased to 30 km. If the data indicates otherwise, a troubleshooting operation may be required.

Figure 12:
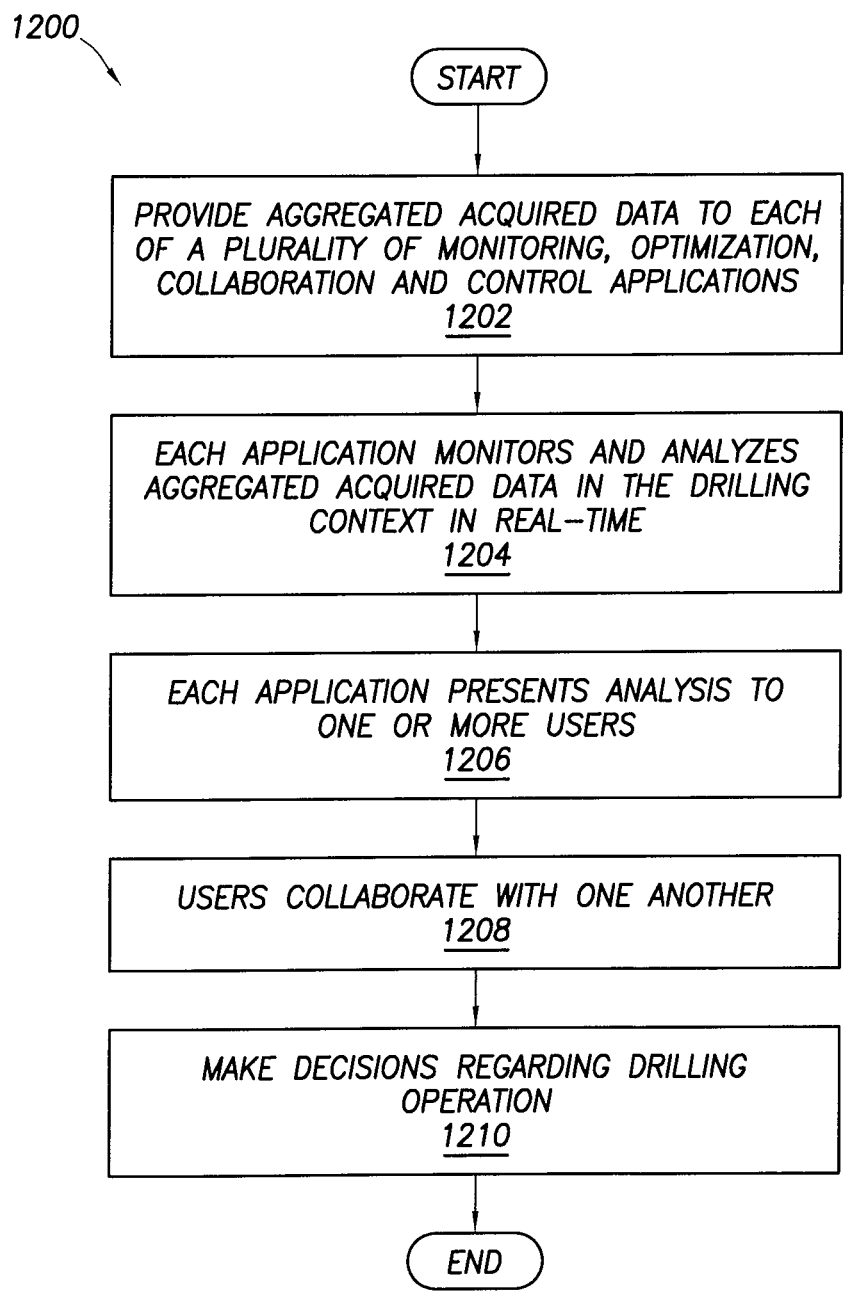
FIG. 12 depicts a flowchart of a process for collaboration among a plurality of users for controlling a drilling operation in accordance with implementations of various techniques described herein.

FIG. 12 is a flowchart of a process for collaboration among a plurality of users for controlling a drilling operation. It should be understood that the operations illustrated in the flow diagram are not limited to being performed by the process. Additionally, it should be understood that while the operational flow diagram indicates a particular order of execution of the process, in some implementations, certain portions of the process might be executed in a different order.

The process is generally designated by reference number 1200, and may be implemented by blocks 1114 and 1116 in FIG. 11. The process begins by providing aggregated acquired data to each of a plurality of real-time monitoring, optimization, collaboration and control applications (block 1202). Each application monitors and analyzes the aggregated acquired data in the drilling context in real-time to form an analysis (block 1204). Each application additionally presents the analysis to one or more users (block 1206). The presentations may include graphical and other displays in one or more views and/or formats.

The users may collaborate with one another to discuss the results of the analysis, to identify potential problems with the drilling operation, and to identify possible solutions to any identified problems (block 1208). The collaboration may occur as discussed above with respect to FIG. 9. Based on the collaboration, decisions may be made regarding the drilling operation (e.g., adjustments to the drilling operation, ceasing drilling operations, etc.) (block 1210).

Figure 13:
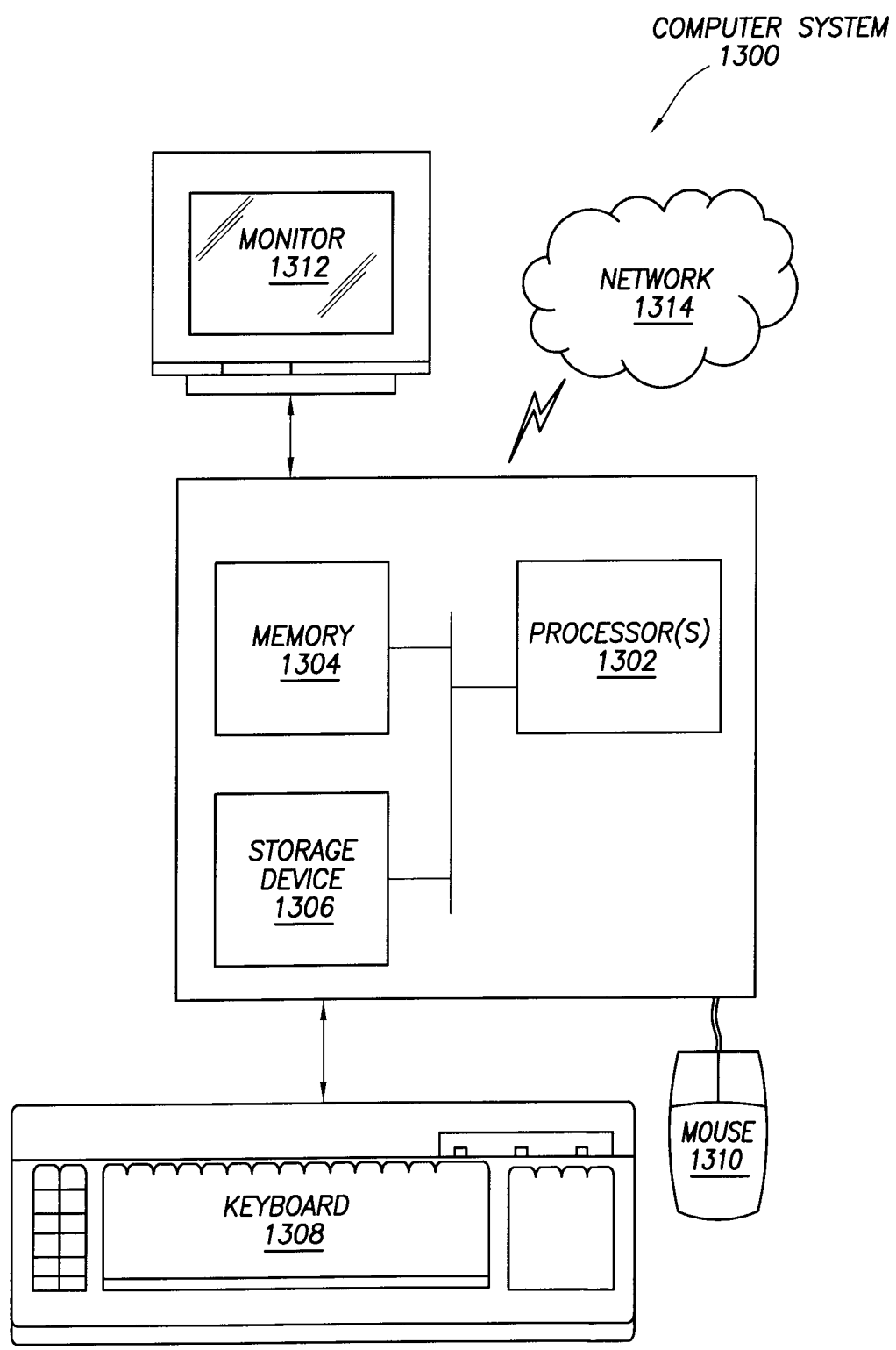
FIG. 13 depicts an example computer system into which implementations of various techniques described herein may be implemented in accordance with one or more embodiments.

Embodiments of data aggregation for drilling operations (or portions thereof), may be implemented on virtually any type of computer regardless of the platform being used. For example, as shown in FIG. 13, a computer system 1300 includes one or more processor(s) 1302, associated memory 1304 (e.g., random access memory (RAM), cache memory, flash memory, etc.), a storage device 1306 (e.g., a hard disk, an optical drive such as a compact disk drive or digital video disk (DVD) drive, a flash memory stick, etc.), and numerous other elements and functionalities typical of today's computers (not shown). The computer system 1300 may also include input means, such as a keyboard 1308, a mouse 1310, or a microphone (not shown). Further, the computer system 1300 may include output means, such as a monitor 1312 (e.g., a liquid crystal display (LCD), a plasma display, or cathode ray tube (CRT) monitor). The computer system 1300 may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system 1300 includes at least the minimal processing, input, and/or output means necessary to practice one or more embodiments.

Further, those skilled in the art will appreciate that one or more elements of the aforementioned computer system 1300 may be located at a remote location and connected to the other elements over a network. Further, one or more embodiments may be implemented on a distributed system having a plurality of nodes, where each portion may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions for performing one or more embodiments of data aggregation for drilling operations may be stored on a computer readable medium such as a compact disc (CD), a diskette, a tape, or any other computer readable storage device.

The systems and methods provided relate to the acquisition of hydrocarbons from a field. It will be appreciated that the same systems and methods may be used for performing subsurface operations, such as mining, water retrieval and acquisition of other underground materials. Further, portions of the systems and methods may be implemented as software, hardware, firmware, or combinations thereof.

While specific configurations of systems for performing data aggregation for drilling operations are depicted, it will be appreciated that various combinations of the described systems may be provided. For example, various combinations of selected modules may be connected using the connections previously described. One or more modeling systems may be combined across one or more fields to provide tailored configurations for modeling a given field or portions thereof. Such combinations of modeling may be connected for interaction therebetween. Throughout the process, it may be desirable to consider other factors, such as economic viability, uncertainty, risk analysis and other factors. It is, therefore, possible to impose constraints on the process. Modules may be selected and/or models generated according to such factors. The process may be connected to other model, simulation and/or database operations to provide alternative inputs.

It will be understood from the foregoing description that various modifications and changes may be made in embodiments of data aggregation for drilling operations without departing from its true spirit. For example, during a real-time drilling of a well it may be desirable to update the field model dynamically to reflect new data, such as measured surface penetration depths and lithological information from the real-time well logging measurements. The field model may be updated in real-time to predict key parameters (for example, pressure, reservoir fluid or geological composition, etc.) in front of the drilling bit. Observed differences between predictions provided by the original field model concerning well penetration points for the formation layers may be incorporated into the predictive model to reduce the chance of model predictability inaccuracies in the next portion of the drilling process. In some cases, it may be desirable to provide faster model iteration updates to provide faster updates to the model and reduce the chance of encountering any expensive field hazard.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

This description is intended for purposes of illustration only and should not be construed in a limiting sense. The scope of data aggregation for drilling operations should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded. In addition, the term "set of" means one or more.

The description of data aggregation for drilling operations has been presented for purposes of illustration and description, and is not intended to be exhaustive or limited to data aggregation for drilling operations in the form disclosed. Many modifications and variations will be apparent to those of ordinary skill in the art. The embodiment was chosen and described in order to best explain the principles of data aggregation for drilling operations, the practical application, and to enable others of ordinary skill in the art to understand data aggregation for drilling operations for various embodiments with various modifications as are suited to the particular use contemplated.

What is claimed is:

1. A method for aggregating real-time data for a drilling operation, comprising:
    acquiring the real-time data from a plurality of data sources associated with the drilling operation;
    synchronizing a timing of the real-time data for aggregating the real-time data to generate synchronized aggregated data by:
        identifying times that the real-time data is created at each of the plurality of data sources; and
        synchronizing the real-time data by adjusting the times of the real-time data from each of the plurality of data sources to refer to a same clock at a server that receives the real-time data, wherein identifying the times that the real-time data is created at each of the plurality of data sources comprises:
            synchronizing a clock at each of the plurality of data sources with the clock at the server;
            determining a round-trip latency of the real-time data to be transmitted from a data source of the plurality of data sources to the server by passing a token between the data source and the server; and
            identifying the times that the real-time data is created based on a time of receipt of the real-time data at the server as adjusted by the round-trip latency;
    determining a drilling context based on the synchronized aggregated data by:
        computing separate probabilities of a plurality of states of a drilling rig from the synchronized aggregated data;
        combining the separate probabilities to provide a probability of the drilling rig being in one of the plurality of states; and
        using a largest probability among the plurality of states to give the drilling context to subsequent acquired data;
    analyzing the synchronized aggregated data in the drilling context to generate an analysis;
    presenting the analysis to a plurality of users at a plurality of different locations; and
    adjusting the drilling operation based on the analysis and inputs of each of the plurality of users.

* * * * *